(12) United States Patent
Oberle et al.

(10) Patent No.: US 10,201,042 B1
(45) Date of Patent: Feb. 5, 2019

(54) FLEXIBLE HELICAL HEATER

(71) Applicant: TRS GROUP, Inc., Longview, WA (US)

(72) Inventors: Daniel Oberle, Sylvania, OH (US); Gregory L. Beyke, Franklin, TN (US); Collin O'Brien, Sylvania, OH (US); Jacob Seeman, Reno, NV (US); Emily Crownover, Weldon Spring, MO (US)

(73) Assignee: TRS Group, Inc., Longview, WA (US)

( * ) Notice: Subject to any disclaimer, the term of this patent is extended or adjusted under 35 U.S.C. 154(b) by 0 days.

(21) Appl. No.: 15/875,543

(22) Filed: Jan. 19, 2018

(51) Int. Cl.
| | | |
|---|---|---|
| *B09C 1/06* | (2006.01) | |
| *E02D 3/11* | (2006.01) | |
| *H05B 3/54* | (2006.01) | |
| *E21B 36/04* | (2006.01) | |
| *E21B 43/28* | (2006.01) | |

(52) U.S. Cl.
CPC .............. *H05B 3/54* (2013.01); *B09C 1/062* (2013.01); *E02D 3/11* (2013.01); *E21B 36/04* (2013.01); *E21B 43/281* (2013.01)

(58) Field of Classification Search
CPC .. E21B 36/04; H05B 3/03; H05B 3/18; H05B 3/42; H05B 3/44; H05B 3/52; H05B 3/48; H01C 3/14; H01C 3/20; H01C 1/02; H01C 1/028; H01C 1/03; Y10T 29/49083; Y10T 29/49091; Y10T 29/4981
See application file for complete search history.

(56) References Cited

U.S. PATENT DOCUMENTS

| | | | | | |
|---|---|---|---|---|---|
| 1,058,380 | A | * | 4/1913 | Monnot ................... | H05B 3/48 318/381 |
| 1,516,836 | A | * | 11/1924 | Williamson ............ | E21B 36/04 392/303 |
| 1,911,063 | A | * | 5/1933 | Daly ........................ | H01B 7/16 29/614 |
| 2,112,729 | A | * | 3/1938 | Abbott ..................... | H05B 3/48 174/102 R |
| 2,499,961 | A | * | 3/1950 | Lennox .................... | H05B 3/48 100/320 |
| 2,685,930 | A | * | 8/1954 | Albaugh ............. | E21B 43/2401 166/248 |
| 2,722,278 | A | * | 11/1955 | Kaasa ..................... | E21B 36/02 166/59 |
| 2,902,270 | A | | 9/1959 | Salomonsson et al. | |
| 3,153,342 | A | | 10/1964 | Pierce et al. | |
| 3,438,444 | A | * | 4/1969 | Wilkerson .............. | E21B 36/04 166/304 |
| 3,674,985 | A | * | 7/1972 | Ragault .................... | H05B 3/78 219/523 |

(Continued)

FOREIGN PATENT DOCUMENTS

| | | | | |
|---|---|---|---|---|
| CA | 2874626 A1 | * | 11/2013 | ............... H05B 3/48 |
| GB | 671117 A | * | 4/1952 | ............... H05B 3/48 |

OTHER PUBLICATIONS

International Search Report and Written Opinion, dated May 23, 2018, for International Application No. PCT/US2018/014472.

*Primary Examiner* — Jennifer H Gay

(74) *Attorney, Agent, or Firm* — Joan T. Kluger; Barnes & Thornburg LLP

(57) ABSTRACT

A heater having a helical electrical resistance heating wire connected to and coiled around a current return wire. The heater is employed in thermal conduction heater wells used for removing contaminants from soil, groundwater or rock.

13 Claims, 3 Drawing Sheets

(56) References Cited

U.S. PATENT DOCUMENTS

| | | | | |
|---|---|---|---|---|
| 3,678,249 A | * | 7/1972 | Lennox | H05B 3/48 219/523 |
| 3,813,771 A | * | 6/1974 | Skogland | H05B 3/52 29/423 |
| 3,920,963 A | * | 11/1975 | Beasley | G01K 7/04 219/494 |
| 3,948,319 A | | 4/1976 | Pritchett | |
| 4,158,764 A | * | 6/1979 | Yane | H05B 3/80 219/523 |
| 4,376,244 A | * | 3/1983 | Gellert | B29C 45/30 219/523 |
| 4,593,182 A | * | 6/1986 | Schwarzkopf | H05B 3/48 219/523 |
| 4,670,634 A | | 6/1987 | Bridges et al. | |
| 4,721,847 A | * | 1/1988 | Leverenz | B29C 45/30 219/421 |
| 4,957,393 A | | 9/1990 | Buelt et al. | |
| 4,984,594 A | | 1/1991 | Vinegar et al. | |
| 5,011,329 A | | 4/1991 | Nelson et al. | |
| 5,018,576 A | | 5/1991 | Udell et al. | |
| 5,076,727 A | | 12/1991 | Johnson et al. | |
| 5,114,497 A | | 5/1992 | Johnson et al. | |
| 5,169,263 A | | 12/1992 | Johnson et al. | |
| 5,190,405 A | | 3/1993 | Vinegar et al. | |
| 5,193,934 A | | 3/1993 | Johnson et al. | |
| 5,221,827 A | | 6/1993 | Marsden, Jr. et al. | |
| 5,233,164 A | | 8/1993 | Dicks et al. | |
| 5,244,310 A | | 9/1993 | Johnson | |
| 5,318,116 A | | 6/1994 | Vinegar et al. | |
| 5,330,291 A | | 7/1994 | Heath et al. | |
| 5,347,070 A | | 9/1994 | Heath et al. | |
| 5,558,463 A | | 9/1996 | Geisel | |
| 5,674,424 A | | 10/1997 | Iben et al. | |
| 5,769,569 A | | 6/1998 | Hosseini | |
| 5,986,159 A | | 11/1999 | Aines et al. | |
| 5,994,670 A | | 11/1999 | Buettner | |
| 6,023,554 A | | 2/2000 | Vinegar et al. | |
| 6,285,014 B1 | | 9/2001 | Beck et al. | |
| 6,485,232 B1 | | 11/2002 | Vinegar et al. | |
| 6,632,047 B2 | | 10/2003 | Vinegar et al. | |
| 6,951,436 B2 | | 10/2005 | Stegemeier et al. | |
| 7,290,959 B2 | | 11/2007 | Beyke et al. | |
| 7,534,926 B2 | | 5/2009 | Stegemeier et al. | |
| 7,618,215 B2 | | 11/2009 | Haemers et al. | |
| 8,348,551 B2 | | 1/2013 | Baker et al. | |
| 8,453,739 B2 | * | 6/2013 | Parsche | E21B 43/2401 166/302 |
| 9,364,877 B2 | | 6/2016 | Brady | |
| 9,370,809 B2 | | 6/2016 | Brady et al. | |
| 9,718,103 B2 | | 8/2017 | Haemers | |
| 2003/0196801 A1 | * | 10/2003 | Vinegar | B09C 1/02 166/263 |
| 2007/0023418 A1 | * | 2/2007 | Schlipf | H05B 3/04 219/532 |
| 2008/0078551 A1 | * | 4/2008 | DeVault | E21B 36/02 166/302 |
| 2010/0089584 A1 | * | 4/2010 | Burns | E21B 43/2401 166/302 |
| 2010/0147826 A1 | * | 6/2010 | Schlipf | H05B 3/48 219/481 |
| 2011/0295504 A1 | | 12/2011 | Barber et al. | |
| 2013/0202363 A1 | | 8/2013 | Haemers | |
| 2013/0206748 A1 | * | 8/2013 | Vinegar | E21B 36/04 219/542 |
| 2015/0001206 A1 | * | 1/2015 | Schlipf | H01C 1/02 219/534 |
| 2015/0010359 A1 | | 1/2015 | Geckeler | |
| 2016/0295641 A1 | * | 10/2016 | Boehmer | H05B 3/06 |

\* cited by examiner

FLEXIBLE HELICAL HEATER

BACKGROUND

Thermal conduction heater wells have application for removing contaminants from soil, groundwater or rock. Thermal conduction heater wells are heating devices that are typically placed into the ground or soil pile to deliver heat energy into a contaminated media. In most applications, drill rigs are used to auger holes into the ground to install a metal casing that can accommodate a heating device to transfer heat to the contaminated surroundings. Existing designs of electrical heater wells have focused on the use of tubular electric heaters for heat generation inside metal casings. These heaters are stiff and difficult to install, especially if the heater is significantly long. Traditional heater designs provide uniform heating over the length of the heater with no ability to alter and adjust the heating at different intervals. Conventional systems are also bulky, typically requiring a casing diameter of six inches or greater to accommodate the heater inside the casing and special equipment to install the large casings and heater components.

Heaters comprised of stiff tubing are also currently used; stainless steel is a common material of construction. Cranes or lift equipment are required to elevate the stiff, pre-constructed, heaters to vertically place them into metal casings below grade. Long conventional heaters must be manufactured on-site because they are too long to ship when pre-constructed. There is no way to change the amount of heating energy delivered for different depth intervals of the heater during the project.

Another thermal conduction heating technology includes installing casings in the ground and pushing hot gas internally through the casing to heat the subsurface. The hot gas is usually supplied by a number of natural gas or propane burners and each burner requires an expensive control system and safety measures. This presents problems such as inefficient energy usage due to the large amount of heat loss in the hot gas exhausted to the air from the heaters and the build-up of acidic condensate in the piping systems during early phases of heating. These gas injection piping systems utilize a pipe inside a pipe and therefore are also bulky and heavy. The minimum outside pipe diameter for these systems is typically four to six inches in diameter. Like tubular electrical heaters, gas heater wells have no practical method to vary the heat output at various depths.

The current practice in subsurface heating continues to be the installation of stiff tubular heaters that are difficult to ship and install and that cannot be modified to provide heating at different depth intervals or easily modified during differing stages of the project. The systems are bulky and require borings of large diameter to support the heater elements.

SUMMARY

A flexible helical heater is disclosed having a helical electrical resistance heating wire connected to a current return wire. The helical electrical resistance heating wire is coiled around the current return wire. The density or pitch of the coils in one or more heating wire sections is maintained by positioning one or more centralizers along the current return wire to create desired heat intensities. In an illustrative application, the flexible helical heater may be inserted into a casing positioned in a subsurface hole to provide thermal conduction heating to remove contaminants from soil, groundwater or rock.

DESCRIPTION OF THE DRAWINGS

The invention is best understood from the following detailed description when read in conjunction with the accompanying drawings of illustrative embodiments.

DESCRIPTION OF EMBODIMENTS

Embodiments of the flexible helical heater include an electrical resistance heating wire coiled about a current return wire that may be shipped and installed more easily than conventional heaters, and may provide adjustability of heating at different levels. Embodiments of the flexible helical heater can be compressed like a spring to create a more compact product for shipping or otherwise transporting. The flexible helical heater may fit inside a subsurface metal casing of much smaller diameter than is typically used in the industry when employing stiff heaters. Special equipment needed to install stiff, tubular heaters, such as cranes or other lift equipment, may not be needed with embodiments of the flexible helical heater. In a particular embodiment, the flexible helical heater can fit inside a pipe as small as 25 millimeters to 50 millimeters in diameter. Coil density or helix pitch can be modified to regulate heating for different depths. As used herein, "coil density" is the number of coils per length unit and is the inverse of helix pitch. Changes in heating may be more easily implemented in the field after a project has started than with stiff, tubular heaters. In an exemplary embodiment the flexible helical heater is more light-weight than conventional stiff heaters, which may make it easier and safer to install. A generally circular type coil will typically be easiest to create and empty but other shape coiling can achieve similar effects and devices.

Figure 1:
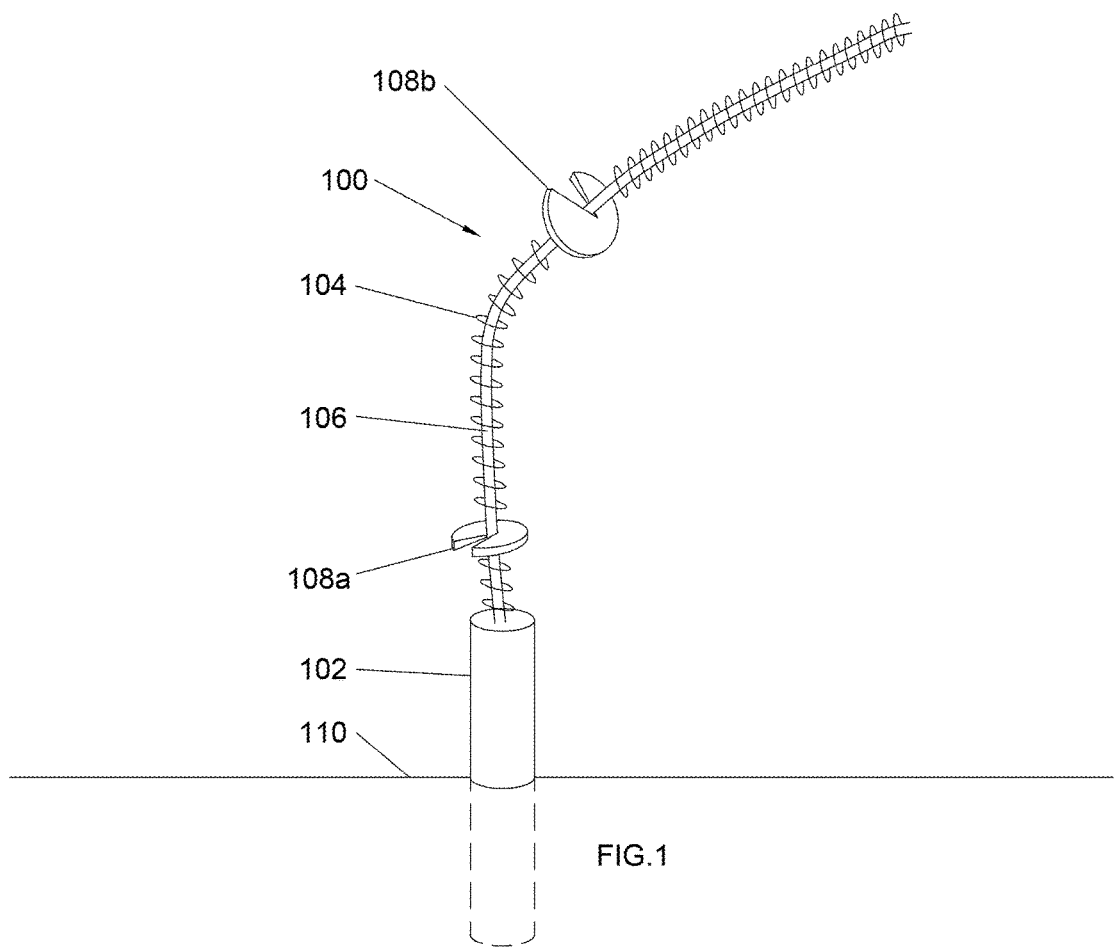
FIG. 1 depicts an embodiment of a flexible heater being inserted into a heater well casing.

FIG. 1 depicts an embodiment of a flexible helical heater 100 being inserted into a heater well casing 102, which typically comprises metal. Flexible helical heater 100 has a helical heating wire 104, which may be for example, a NiChrome wire, or other suitable electric resistance heating wire. In an exemplary embodiment, helical heating wire 104 is a flexible, high-temperature wire. Although the invention may be described with regard to NiChrome wires, wires consisting of other suitable alloys or metals may be used. As used herein, "NiChrome" refers to a nickel-chromium alloy. Nickel-chromium alloys that contain other metals may also be used. Typically nickel will be the primary metal in the alloy, i.e. making up the largest percent of the metals. The terms "helical" and "helix" are used broadly and include coiling that mathematically is not a helix and also that which is a mathematical helix. In an exemplary embodiment, helical heating wire 104 may have a diameter in the range of 0.025 millimeters to approximately 10 millimeters, which may be, for example, a NiChrome wire gauge in the size range of 000 to 50 American Wire Gauge (AWG). In a further illustrative embodiment, the diameter of helical heating wire 104 is in the range of 1 to 4 millimeters (17 to 6 AWG). Generally, the diameter of helical heating wire 104 is selected for optimum flexibility and coil density.

An illustrative helix internal diameter may range from 5 millimeters to greater than 150 millimeters when used in a large casing. In a further embodiment, helical heating wire 104 will have an internal helix diameter in the range of 6 millimeters to 40 millimeters. Helical heating wire 104 in this range will typically allow for insertion into small casings which may save time and money. Heat from helical heating wire 104 is transferred to heater well casing 102.

A current return wire 106 runs concentrically through the coils of helical heating wire 104 to serve as both a support for the heater and an electrical current return. Although current return wire 106 is described as being concentrically disposed through the coils, it may not be specifically centered within the coils, and its position with respect to the coils may vary throughout its length. Current return wire 106 may be, for example, a flexible, high-temperature rated, ceramic-insulated wire. An illustrative temperature rating of current return wire 106 is at or near 1000° C., and therefore, in which case mica and ceramic-braided insulation on a nickel wire conductor may be suitable. Other examples of materials include mica and fiberglass insulation on nickel-plated copper wire; although this option offers a lower temperature rating. Current return wire 106 may also be constructed as an uninsulated wire that is manually wrapped with a high-temperature insulation. For example, bare nickel-plated wire or stock nickel welding wire may be manually wrapped with a ceramic fiber tape to create a flexible, insulated current return wire. Current return wire 106 may have an outer diameter in the range of typical wire sizes ranging from 50 AWG to 000 AWG (which corresponds to approximately 0.025 millimeters to 10 millimeters in diameter). In a further illustrative embodiment, the diameter of current return wire 106 is in the range of approximately 1 millimeter to 7 millimeters (17 to 1 AWG). Illustratively, the diameter of current return wire 106 provides sufficient structural support and adequate surface area to reduce resistance. In an illustrative embodiment, current return wire 106 occupies helix-internal space defined by coils of helical heating wire 104 in the range of 0.1 to 99%. In an exemplary embodiment, the space occupied by current return wire 106 within the helix-internal space is in the range of 16 to 71%.

Further shown in FIG. 1 is an electrically-insulating centralizers 108a, 108b to position sections of helical heating wire 104, including maintaining selected coil density.

Figure 2:
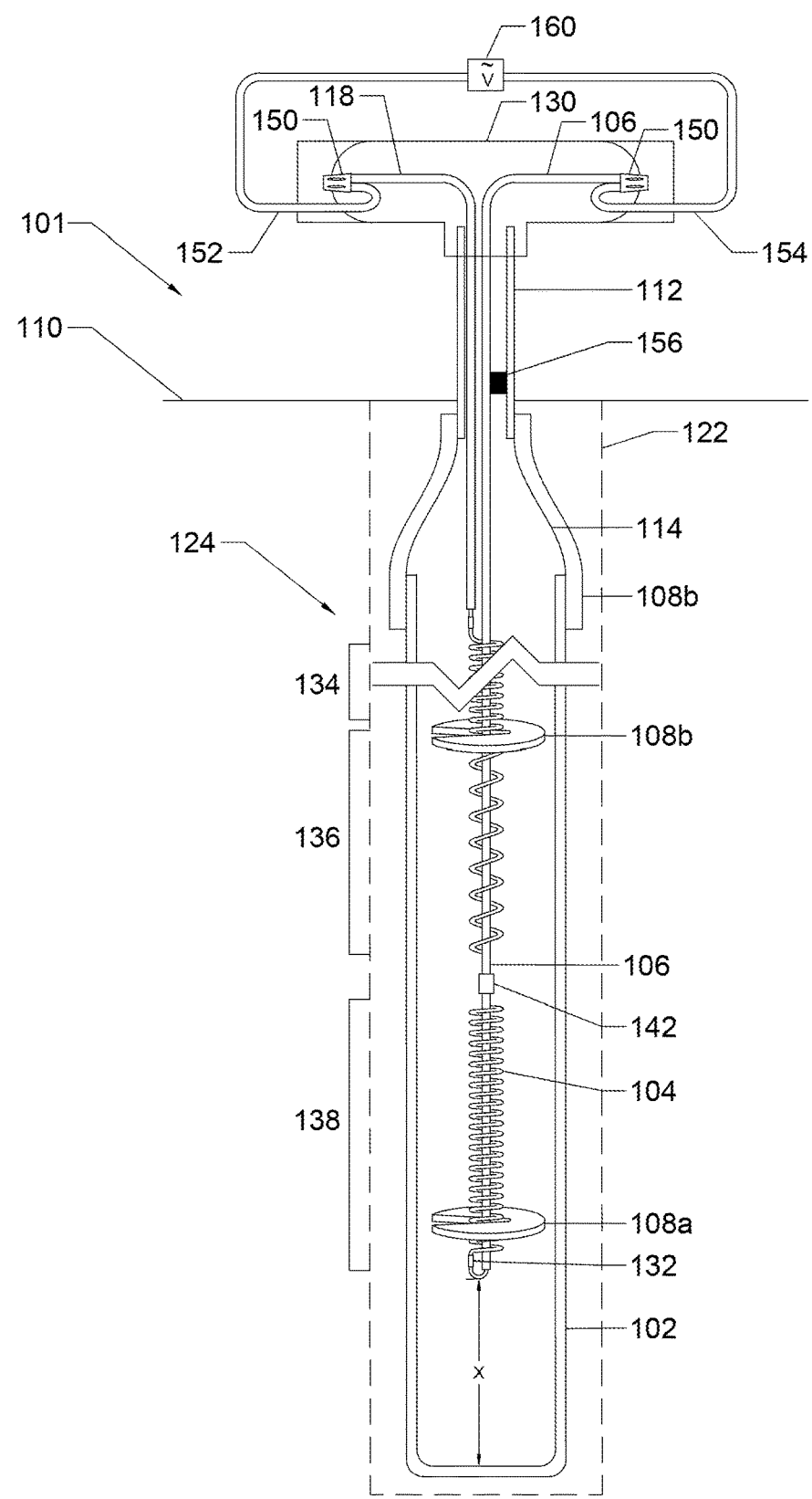
FIG. 2 is a schematic of a heater well used for subsurface heating applications having a resistance heating wire coiled around a current return wire, wherein the coil density can be adjusted to obtain desired heating intensities. The flexible helical heater is shown within a cross-section of other components that together comprise the heater well.

FIG. 2 is a schematic of a heater well 101 used for heating, with applications of soil, groundwater or rock to remove contaminants. In an illustrative embodiment, the submersed portion 124 of heater well 101 is placed within the soil, groundwater or rock (also called the "remediation material") that is targeted for contaminant removal. Submersed portion 124 of heater well 101 may be created by boring or punching a hole 122 into the remediation material and inserting a casing 102. Hole 122 is shown by a broken line and a cross section of casing 102 is depicted. As used herein, "punched" means an installation method in which a hole 122 is formed by compressing or displacing subsurface material. In other subsurface embodiments, hole 122 may not be lined with a casing or may be lined with another material or component. For example, no lining may be required in solid, competent, bedrock. Submersed portion 124 of heater well 101 may also exist in an above-ground heating application. For example, if soil or rock is excavated and staged in a pile or box at the surface, submersed portion 124 of heater well 101 may extend through the remediation material interface 110 in an above-ground treatment application. Accordingly, "submersed portion" is intended to mean the portion of heater well 101 that is within the remediation material or its surrounding material. Remediation material interface 110 is defined as the layer that separates the remediation material to be treated (soil, groundwater or rock) from its surroundings. In an above-ground or subsurface application, casing 102 may extend into the remediation material for a significant distance. In an above-ground application, several hundred feet of casing 102 may be laid out horizontally or otherwise, non-vertically, within the soil, rock or groundwater for heating. In a subsurface application, casing 102 may extend to the maximum achievable depth of drilling equipment, typically in the range of 30 meters to 60 meters for environmental remediation applications.

At the top edge of casing 102 is optional reducer 114. Reducer 114 and a pass-through 112 provide a cross-sectional pipe area less than that of casing 102 to reduce vertical thermal conduction and convection outside the targeted remediation material. Although reducer 114 is illustrated as a bell reducer, an equivalent fitting that effectively reduces the diameter to pass-through 112 may be used, such as a reducing bushing. Reducing the vertical thermal conduction and convection typically reduces heat losses and the temperature of surface components. Insulating material 156 may also be placed within pass-through 112 to further prevent or reduce conductive and convective heat transfer out of casing 102. Insulating material 156 may consist of any high-temperature flexible insulating media such as mineral wool, glass wool or ceramic cloth. Pass-through 112 might be constructed of stainless steel or ceramic to further reduce its thermal conductivity. Pass-through 112 accommodates a current delivery wire 118, and current return wire 106. Illustratively, both current delivery wire 118 and current return wire 106 are insulated wires that have high temperature rating. Pass-through 112 supports electrical connection box or "junction box" 130. Junction box 130 can take many forms, including those known in the art. Because junction box 130 is typically near ambient temperature, it can use standard electrical components. Current delivery wire 118 and current return wire 106 connect to power source wires 152, 154, respectively, within junction box 130. Power source wires 152, 154 provide electrical power from a power source 160, which applies different voltages to wires 152, 154. Power Source wires 152, 154 may be, for example, standard copper wires, and may be connected to current delivery wire 118 and current return wire 106, respectively, by any conventional connection means, for example by wire nuts 150 as illustrated in FIG. 2.

Helical heating wire 104 is disposed within casing 102. Within helical heating wire 104 is current return wire 106. A first centralizer 108a and second centralizer 108b position current return wire 106 and helical heating wire 104. First and second centralizers 108a, 108b may provide electrical insulation of helical heating wire 104 and current return wire 106 from casing 102. For insulation purposes, first and second centralizers 108a, 108b may be made of, for example, ceramic (for example; alumina, mullite or zirconia) or porcelain, or other suitable high temperature insulating material that can withstand the temperatures to which they will be exposed in the system during operation.

In an exemplary embodiment, one or more centralizers are installed onto current return wire 106 In FIG. 2, first and second centralizers 108a, 108b correspond to lower and upper positions, respectively, however, it is noted that submersed portion 124 of heater well 101 need not be vertical. Submersed portion 124 of heater well 101 may be positioned as necessary to reach desired heating locations. This may include positioning submersed portion 124 of heater well 101 to avoid interference with structures in the vicinity. Heater well 101 may be positioned below permanently-located or fixedly-located objects.

Electrical current is delivered by power wire 152 to helical heating wire 104 through current delivery wire 118 that passes through pass-through 112 at or near the top of heater well 101. Pass-through 112 extends into junction box 130. Pass-through 112 may be for example, a stainless steel pipe or other hollow component that reduces thermal conduction and convection. In an exemplary embodiment, pass-through 112 is a 12 to 152 millimeter diameter type 304 stainless steel pipe. The optimum material of pass-through 112, like other components of heater well 101, depends, at least in part, on the environment. For example, in certain conditions, corrosion-resistant metals or alloys may be beneficial. Current delivery wire 118 connects to helical heating wire 104, at the top of the targeted remediation material.

Helical heating wire 104 is connected to an insulated current return wire 106 toward or at the bottom of heater well 101 with a wire connector 132, which may be a high-temperature butt splice or other crimp connector. Other components that connect helical heating wire 104 to insulated current return wire 106 and function to provide the necessary electrical qualities may be used. Helical heating wire 104 extends to varying distances within casing 102, but in an exemplary embodiment does not extend any closer to the bottom of casing 102 than a distance "X" equivalent to approximately 2% of the length of the entire flexible helical heater 100 in order to allow room for thermal expansion. For example, if the flexible helical heater 100 were 10 meters in length, a distance "X" of 0.2 meters (2% of 10 meters) should exist between the bottom of flexible helical heater 100 and the bottom of casing 102.

Helical heating wire 104 may vary in pitch, i.e. density of the coils, throughout its length, and may also have non-coiled sections. FIG. 2 shows a first coiled section 134 extending from current delivery wire 118, and having a relatively high coil density. A second coiled section 136 extends below first coiled section 134, and has a lower coil density. The area surrounding first coiled section 134 will have a higher heat output than the area surrounding second coiled section 136 because of the higher density of coils. A third coiled section 138 is shown extending further into heater well 101, in which the coils have a similar density to that in first coiled section 134. Variation in heat output is desired for many reasons, one of which is to counter heat losses at the top and the bottom of the targeted heated volume, and therefore, achieve a more uniform subsurface temperature at a distance from the heater well. The coils of helical heating wire 104 may be pulled apart or compressed as desired to achieve the most appropriate heating for targeted portions of the remediation material. For example, if a site is impacted from a fuel spill to 10 meters below ground (10 meters below the remediation material interface 110), but most of the fuel is known to exist between the depths of 2 to 5 meters, the coil density of helical heating wire 104 would be compressed across a section of helical heating wire 104 extending from 2 to 5 meters into casing 102, thereby creating a greater heat output per length than a wire section with lower coil density. The coil density may be expanded to provide a lower coil density in other portions of heater well 101. In addition, the distribution of coil density along the length of heater well 101 can be varied during a break in heater operation. Illustrative embodiments of flexible helical heater 100 may allow such variations to be accomplished relatively easily and in a short period of time. In an exemplary method, flexible helical heater 100 can be removed from casing 102, centralizers 108a, 108b can be slipped off current return wire 106, the coil density can be re-distributed and centralizers 108a, 108b returned to the current return wire 106, installed to maintain the adjusted coil density and position. Additionally, or instead, one or more centralizers may be removed. This ease of modification allows the operator to adjust to unexpected subsurface conditions encountered during operation, such as a cool interval caused by inflowing groundwater.

FIG. 2 shows second centralizer 108b disposed between first coiled section 134 and second coiled section 136. First centralizer 108a is placed below third coiled section 138 and above wire connector 132. Wires may be wrapped at centralizer locations, such as shown by tape 142, between second coiled sections 136 and third coiled section 138. A centralizer may be placed over tape 142. Tape 142 may be ceramic tape, for example.

Figure 3:
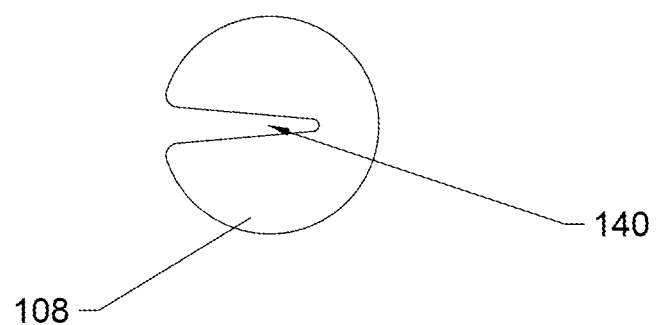
FIG. 3 depicts a centralizer in the form of a notched centralizer.

FIG. 3 depicts a centralizer 108 in the form of a notched disk. Although shown as a circular disk, the shape of centralizer 108 is not critical and it may take on other shapes such as a triangle, square, polygon or irregular shape while still maintaining its purpose and function. Notch 140 is provided so centralizer 108 can be pushed laterally onto current return wire 106 to provide an interference fit or friction fit. The notch may be any shape that can provide the proper fit so it can be inserted and remains in place. Other mechanisms may be used to secure centralizer 108 onto return wire 106, provided they adequately position the centralizers, maintain the desired coil density, and withstand the environment and heating process. The term "laterally" is used broadly herein and does not imply a precise direction. Centralizer 108 may be placed on helical heating wire 104 either between coils or between a coiled and straight section. Tape 142 may provide extra wire protection at the centralizer location and increase the friction fit. Centralizer 108 may prevent helical heating wire 104 from contacting casing 102 when placed into heater well 101. Centralizer 108 also may secure loops of helical heating wire 104 to current return wire 106 at selected depths into casing 102 to alter the amount of heat intensity as desired. The notched configuration of centralizer 108 allows coil-density to be changed during a heating project for soil, groundwater or rock.

Returning to FIG. 2, first and second centralizers 108a, 108b are secured to current return wire 106 sufficiently to maintain coiled sections 134, 136, 138 at the desired depths and with the selected coil density. Although three helically coiled sections are shown for illustration purposes in FIG. 2, the design may include more or less helically coiled sections depending on how many different levels of heating are desired.

In the configuration shown in FIG. 2, first and second centralizers 108a, 108b have a larger diameter than the narrowest part of reducer 114. Therefore, installation includes boring a hole into the ground, roughly of uniform diameter, inserting helical heating wire 104 and current return wire 106, expanding and compressing helical heating wire 104 as desired and placing first and second centralizers 108a, 108b as needed to maintain the desired coil compression or pitch. Reducer 114 may then be put in place to reduce the diameter of the opening at the top of casing 102.

FIG. 2 shows two centralizers 108a, 108b. Depending on the distribution of coil densities needed to obtain the desired heating distribution or amount, one or more centralizer may be needed, or if a uniform coil density is chosen, then no centralizers need to be used, unless required for electrical isolation purposes or other benefits. Centralizers 108a, 108b prevent uninsulated helical heating wire 104 from contacting steel casing 102 and causing an electrical short circuit, which may occur for example, in situations where the diameter of casing 102 is small or the casing is not installed perfectly vertical. If the casing is not vertical, then generally more centralizers are required.

In an illustrative embodiment, power is fed to helical heating wire 104 using high-temperature insulated wires of different voltage potential attached to both ends of helical heating wire 104. Helical heating wire 104 attaches to current delivery wire 118 at a first end of helical heating wire 104, and to current return wire 106 at a second, opposite end. In an exemplary embodiment, helical heating wire 104 is NiChrome and current return wire 106 and current delivery wire 118 are 100% nickel and the insulation surrounding the nickel wire is a ceramic-fiber braid. Note that although current return wire 104 and current delivery wire 118 as described indicate operation of the flexible helical heater 100 in a direct current (DC) mode, electrical current to the helical heating wire 104 may be delivered as either DC or alternating current (AC).

Embodiments of helical heating wire 104 may provide greater flexibility in the design of heater well 101. The following factors, among possible others, may be independently varied to adjust the configuration and performance of heater well 101:
1. applied voltage across the flexible helical heater
2. heat intensity
3. wire diameter
4. helix diameter
5. helix pitch/coil density.

For a given heat intensity, factors that increase the surface area of helical heating wire 104, such as larger coil diameter or smaller pitch, result in a lower coiled heating wire temperature. The gauge of helical heating wire 104 can be decreased, i.e. diameter increased, if it is desired to make helical heating wire 104 stiffer and more durable. The variability of the factors, may allow heater well 101 to be tailored to a wide range of situations and applications.

In an illustrative embodiment, the applied voltage across helical heating wire 104 is in the range of 5 volts per foot to 15 volts per foot of heated depth or heater well length. The heat intensity is illustratively 200-500 W/ft. Illustrative helical heating wire 104 specifications include, a wire diameter of 6-18 gauge; a helix diameter in the range of 12 millimeters to 25 millimeters; and a pitch of 5 millimeters to 50 millimeters. The illustrative pitch range may be varied along a single section coiled section of helical heating wire 104 or between different coiled sections.

The insulated current return wire 106 is critical to flexible helical heater 100 in that it provides the support to suspend, and the power to operate, helical heating wire 104. Examples of current return wire 106 materials that may be suitable for various temperatures follow. In an application where only moderately high temperatures of less than 200° C. are anticipated within the heater well, current return wire 106 may be constructed of copper wire with a fluorinated polymer insulation, such as Teflon. Where temperatures in the range of 200° C. to 400° C. may be anticipated, current return wire 106 may be constructed of nickel-coated copper wrapped in a glass-fiber, mica-fiber or ceramic-fiber insulation. At temperatures above 400° C., current return wire 106 may be constructed of nickel wire with a ceramic-fiber insulation. Such wires may not be available in the marketplace, but may be constructed as needed by wrapping a nickel wire with ceramic fiber tape. The coiled design of helical heating wire 104 allows for expansion inside casing 102 while preventing incidental contact of helical heating wire 104 with the walls of casing 102 because the expansion is taken up in the coils. The coil density (number of heating wire coils per specific length of heater or "helix pitch") can be changed to apply different heating intensities at different depth intervals of heater well 101. Centralizers 108a, 108b can be removed to adjust coil density at nearly any time during use, including prior to or in the middle of a heating project, such as for example, soil, groundwater or rock, if needed.

Flexible helical heater 100 may be employed to remediate contaminants using various methods. In an illustrative embodiment, a hole is bored into the ground, for example by a drill rig. A casing that can accommodate flexible helical heater 100 is installed into the hole. Flexible helical heater 100 transfers heat to the contaminated surroundings. The heat may volatilize contaminants in the soil by increasing the vapor pressure of the contaminants. In other applications, the heat may increase the temperature of groundwater to enhance aqueous-based chemical reactions which destroy the contaminants in place. For compounds that have low volatility, high temperatures may be applied by the heater well to chemically break down the molecular structure of the contaminants. Typically, a series of heater wells will be installed in a contaminated area.

Compared to conventional, bulky, stiff, tubular heaters, illustrative embodiments of flexible helical heater 100 may be easily installed, for example by hand and by only one person, even if flexible helical heater 100 is of substantial length.

Various embodiments of the invention have been described, each having a different combination of elements. The invention is not limited to the specific embodiments disclosed, and may include different combinations of the elements disclosed, omission of some elements or the replacement of elements by the equivalents of such structures. The methods and heaters may include elements that exist in the prior, including for example, those described in the background section of this application.

Terms such as "about," "approximately," when modifying quantities include typical measurement error or amounts that satisfy the purpose of the quantity. The specific amounts without the modifiers are also included as disclosed parameters.

While the invention has been described by illustrative embodiments, additional advantages and modifications will occur to those skilled in the art. Therefore, the invention in its broader aspects is not limited to specific details shown and described herein. Modifications, for example, to dimensions and component materials, and incorporation of equivalent components, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A heating apparatus comprising:
   an insulated current delivery wire configured to be connected to a power supply and extend below ground level into an opening in soil, groundwater or rock;
   an uninsulated flexible helical electrical resistance heating wire having a first end and a second end;
   the helical electrical resistance heating wire electrically connected at the helical electrical resistance heating wire first end to the insulated current delivery wire and extending therefrom further into the opening;
   a flexible insulated current return wire having a first end and a second end, the current return wire first end electrically attached to the helical electrical resistance heating wire second end, wherein the insulated current return wire is configured to provide structural support to the helical electrical resistance heating wire; and the current return wire extending from the second end of the helical electrical resistance heating wire and returning back through helix-internal space defined by coils of the helical electrical resistance heating wire and further extending above ground level, and configured to be connected to the power supply; and wherein one or more of the one or more centralizers is configured to allow the centralizer to slide laterally onto the current return wire and to inhibit coils of the electrical resistance helical heating wire from passing through the centralizer when the one or more centralizers is in operating position.

2. The heating apparatus of claim 1 further comprising one or more electrically-insulating centralizers configured to maintain a position of a section of the helical electrical resistance heating wire and to maintain the coil density of the coils of the section of the helical electrical resistance heating wire.

3. The heating apparatus of claim 2 wherein the one or more centralizers are configured to attach to the current return wire and maintain the position of the one or more centralizers along a length of the current return wire.

4. The heating apparatus of claim 1 wherein one or more of the one or more centralizers is a disk having a notch, wherein the notch is configured to allow the centralizer to slide laterally onto the current return wire, the notch sized to prohibit coils of the electrical resistance helical heating wire from passing through the centralizer when the one or more centralizers are in operating position.

5. The heating apparatus of claim 1 wherein the diameter of the electrical resistance helical heating wire is in the range of 0.025 millimeters to 10 millimeters.

6. The heating apparatus of claim 5 wherein the diameter of the electrical resistance helical heating wire is in the range of 1 millimeter to 4 millimeters.

7. The heating apparatus of claim 1 wherein the coils defining the helix-internal space have a diameter in the range of 5 millimeters to 150 millimeters.

8. The heating apparatus of claim 1 wherein the coils defining the helix-internal space have a diameter in the range of 0.5 millimeters to 25 millimeters.

9. The heating apparatus of claim 1 wherein the current return wire diameter is in the range of 0.025 millimeter to 10 millimeters.

10. The heating apparatus of claim 1 wherein the helical electrical resistance heating wire has a plurality of selectively pitched coils, wherein a selected coil pitch controls the intensity of heat produced by the helical electrical resistance heating wire.

11. A method of heating subsurface soil, groundwater or rock comprising:
providing a flexible helical electrical resistance heating wire attached to a flexible current return wire;
selecting one or more heat intensities for one or more sections along a length of a heater well;
selecting coil density and one or more of applied voltage across the helical electrical resistance heating wire, helical electrical resistance heating wire diameter and coil diameter to obtain the selected one or more heating intensities;
positioning one or more centralizers along the helical electrical resistance heating wire to maintain the length of one or more sections of the helical electrical resistance heating wire and the selected coil density of the one or more sections of the helical electrical resistance heating wire;
inserting the flexible helical electrical resistance heating wire attached to the flexible current return wire into the heater well; and
repositioning one or more centralizers of the one or more centralizers along the helical electrical resistance heating wire to maintain newly selected lengths of one or more sections of the helical electrical resistance heating wire and selected coil densities of the one or more sections of the helical electrical resistance heating wire, thereby adjusting the heat intensity.

12. The method of claim 11 further comprising selecting helical electrical resistance heating wire coil pitch to obtain the selected one or more heating intensities.

13. A heating apparatus comprising:
an insulated current delivery wire configured to be connected to a power supply and extend below ground level into an opening in soil, groundwater or rock;
an uninsulated helical electrical resistance heating wire having a first end and a second end;
the helical electrical resistance heating wire electrically connected at the helical electrical resistance heating wire first end to the insulated current delivery wire and extending therefrom further into the opening;
an insulated current return wire having a first end and a second end, the current return wire first end electrically attached to the helical electrical resistance heating wire second end;
the current return wire extending from the second end of the helical electrical resistance heating wire and returning back through helix-internal space defined by coils of the helical electrical resistance heating wire and further extending above ground level, and configured to be connected to the power supply; and
one or more electrically-insulating centralizers configured to maintain a position of a section of the helical electrical resistance heating wire and to maintain the coil density of the coils of the section of the helical electrical resistance heating wire;
wherein one or more of the one or more centralizers is a disk having a notch, wherein the notch is configured to allow the centralizer to slide laterally onto the current return wire, the notch sized to prohibit coils of the electrical resistance helical heating wire from passing through the centralizer when the one or more centralizers is in operating position.

* * * * *